US010234912B2

(12) United States Patent
Van Dijke et al.

(10) Patent No.: US 10,234,912 B2
(45) Date of Patent: Mar. 19, 2019

(54) DRAWER APPARATUS, INDUSTRIAL COMPUTER, AND METHOD

(71) Applicant: OMRON Corporation, Kyoto (JP)

(72) Inventors: Casper Van Dijke, Den Bosch (NL); Jeremy Wirkus, Eindhoven (NL)

(73) Assignee: OMRON Corporation, Kyoto (JP)

( * ) Notice: Subject to any disclaimer, the term of this patent is extended or adjusted under 35 U.S.C. 154(b) by 154 days.

(21) Appl. No.: 15/389,450

(22) Filed: Dec. 23, 2016

(65) Prior Publication Data

US 2017/0199552 A1 Jul. 13, 2017

(30) Foreign Application Priority Data

Jan. 8, 2016 (DE) .......................... 10 2016 100 240

(51) Int. Cl.
*G06F 1/18* (2006.01)

(52) U.S. Cl.
CPC .............. *G06F 1/185* (2013.01); *G06F 1/181* (2013.01)

(58) Field of Classification Search
CPC ................................. G06F 1/185; G06F 1/181
See application file for complete search history.

(56) References Cited

U.S. PATENT DOCUMENTS

| 6,950,301 | B2 | 9/2005 | Bossio | |
| 7,077,671 | B2 * | 7/2006 | Su | H01R 13/635 439/159 |
| 8,976,521 | B2 * | 3/2015 | Liu | G06K 7/0021 361/679.38 |
| 9,164,539 | B2 * | 10/2015 | Wu | G06F 1/1613 |
| 2006/0087801 | A1 | 4/2006 | Champion et al. | |
| 2010/0002378 | A1 | 1/2010 | Chen et al. | |
| 2016/0081218 | A1 | 3/2016 | Fietz et al. | |

FOREIGN PATENT DOCUMENTS

DE 102013105173 12/2014
JP 2013-205996 10/2013

OTHER PUBLICATIONS

"Office Action of German Counterpart Application", dated Oct. 18, 2016, p. 1-p. 11, with English translation thereof, in which the listed reference (DE102013105173) was cited.
"Office Action of Japan Counterpart Application" with English translation thereof, dated Oct. 24, 2017, p. 1-p. 6, in which the listed references were cited.

* cited by examiner

*Primary Examiner* — James Wu
*Assistant Examiner* — Hung Q Dang
(74) *Attorney, Agent, or Firm* — JCIPRNET

(57) ABSTRACT

A drawer apparatus (10) for use in an expansion card (9) of an industrial computer (1) includes a drawer (22) used for accommodating the expansion card (9), where the drawer (22) includes a bottom portion (23) and at least one side wall (24) connected to the bottom portion (23), and a fixing element (57), where the fixing element (57) is adapted to at least sectionally buckle the at least one side wall (24) and the expansion card (9) in a shape fitting manner, so as to fasten the expansion card (9) on the drawer (22).

14 Claims, 15 Drawing Sheets

DRAWER APPARATUS, INDUSTRIAL COMPUTER, AND METHOD

CROSS-REFERENCE TO RELATED APPLICATION

This application claims the priority benefit of German application serial no. 10 2016 100 240.2, filed on Jan. 8, 2016. The entirety of the above-mentioned patent application is hereby incorporated by reference herein and made a part of this specification.

BACKGROUND OF THE DISCLOSURE

1. Field of the Disclosure

The disclosure relates to a drawer apparatus for use in an expansion card of an industrial computer, an industrial computer including the drawer apparatus, and a method for accommodating an expansion card of an industrial computer in the drawer apparatus.

2. Description of Related Art

An industrial computer or an industrial personal computer or an IPC for short refers to a computer of tasks used in the industrial field. The industrial computer includes a strong housing, and the housing especially protects the industrial computer from influences such as environment factors (such as dust), electromagnetic interference, and/or water. Generally, the industrial computer is applied to process visualization, robot technologies, industrial automation, testing and experiment board working modes, and the like. The industrial computer for devices within an administrative area needs to be very strong and does not easily have a fault. The industrial computer may include a housing, and an expansion board or an expansion card may be pushed into the housing by means of a drawer-shaped support and then is drawn from the housing. JP 2013-20 59 96 A and U.S. Pat. No. 6,950,301 B2 separately describe the drawer-shaped support for use in an expansion card.

SUMMARY OF THE DISCLOSURE

Under the background, the disclosure is directed to providing an improved drawer apparatus for use in an industrial computer.

Therefore, this text proposes a drawer apparatus for use in an expansion card of an industrial computer. The drawer apparatus includes a drawer used for accommodating the expansion card, where the drawer includes a bottom portion and at least one side wall connected to the bottom portion; and a fixing element, where the fixing element is adapted to at least sectionally buckle the at least one side wall and the expansion card in a shape fitting manner, so as to fasten the expansion card on the drawer.

Connection in a shape fitting manner is produced by mutual engagement of at least two connection objects (which are the fixing element, the at least one side wall, and the expansion card here). In this way, the connection objects are made not to be separated even if force transmission does not exist or is interrupted. In other words, in a case in which connection in a shape fitting manner exists, one connection object becomes obstruction to the other object. Therefore, connection between the expansion card and the at least one side wall can be removed by removing the fixing element. Preferably, the fixing element may be elastically deformable and may be clamped onto the expansion card and the at least one side wall.

The fixing element is adapted to buckle the side wall and the expansion card. In this way, the expansion card does not need to be fastened by means of screwed connection. Therefore, while a change operation of the expansion card is simplified, the expansion card is reliably fastened to the drawer.

According to one implementation manner, the at least one side wall includes a basic section and a fixing section vertically protruding from the basic section, and the fixing element is adapted to buckle a fixing section of the at least one side wall and a fixing board of the expansion card in a shape fitting manner.

Preferably, the fixing board of the expansion card also includes a fixing section, and the fixing element is especially adapted to buckle the fixing section of the at least one side wall and the fixing section of the fixing board in a shape fitting manner. Besides the fixing board, the expansion card preferably includes a printed circuit board or a circuit board that is fixedly connected to the fixing board and that is used for fastening an electronic component.

According to another implementation manner, the fixing section includes a first groove and a second groove, and the fixing element is engaged into the first groove and the second groove in a locking state.

Preferably, the fixing section of the fixing board also includes a first groove and a second groove, and the fixing element is engaged into the first groove and second groove in a locking state. Preferably, in a locking state, the first groove or the second groove of the fixing section of the at least one side wall is arranged in a manner congruent with the first groove or the second groove of the fixing section of the fixing board.

According to another implementation manner, the fixing element includes a shaft segment supported in the first groove in a rotatable manner, and the fixing element is adapted to enter the locking state from an unlocking state by means of rotation around the shaft segment, and vice versa.

The shaft segment preferably includes a circular or partially circular cross section. The shaft segment connects two side segments of the fixing element. Particularly, the fixing element is made of plastics. The fixing element may be, for example, a plastic injection molded component. The shaft segment may also be preferably supported in the first groove of the expansion card in a rotatable manner.

According to another implementation manner, the fixing element includes a locking section, which is adapted to be engaged into the second groove in a shape fitting manner the locking state.

The locking section connects the side segments of the fixing element, same as the shaft segment. In a locking state, the locking section is also preferably engaged into the second groove of the expansion card. Particularly, the locking section may be engaged into or buckled to the second groove of the expansion card. The second groove of the expansion card may include a tooth member on an edge, and the tooth member s cut into the locking section when the locking section is pressed into the second groove. In this way, the fixing element can be fastened especially well.

According to another implementation manner, the locking section is adapted to be engaged into the fixing board of the expansion card.

Particularly, the locking section is adapted to be engaged into the fixing section, and especially be engaged into the second groove of the fixing section of the fixing board. Engagement refers to that the locking section is buckled into a groove of the fixing section, and has elastic deformation in this process. In this case, the locking section can be made to be disengaged from the second groove only by elastic deformation again of the locking section or the fixing element.

According to another implementation manner, the drawer apparatus further includes at least one support member, which is adapted to support the expansion card.

Preferably, multiple support members may be disposed. The drawer apparatus may match with expansion cards of different types and sizes by means of the support member.

According to another implementation manner, the at least one support member is guided in at least one guide groove disposed on the bottom portion.

Preferably, multiple guide grooves are disposed on the bottom portion. The guide grooves are preferably constructed as pierced holes in the bottom portion.

According to another implementation manner, the at least one support member includes a guide pin, which is guided in the at least one guide groove.

The guide pin is preferably connected to the basic section of the at least one support member by means of a connection section. When the at least one support member moves, the guide pin produces friction in the guide groove. The at least one support member can be fastened in the guide groove by twisting.

According to another implementation manner, multiple guide grooves are disposed, and the at least one support member can be changed between different guide grooves.

For example, three or four guide grooves are disposed.

According to another implementation manner, the at least one side wall includes an accommodation section for accommodating the fixing board of the expansion card.

The accommodation section preferably includes pierced holes for the fixing board to pass through.

According to another implementation manner, the drawer apparatus further includes a first side wall and a second side wall arranged opposite to the first side wall, where the fixing element is disposed on the first side wall, and the second side wall includes a pierced hole used for inserting the expansion card into the drawer.

Preferably, a front wall of the drawer is arranged between the first side wall and the second side wall. The first side wall, the second side wall, and the bottom portion of the drawer may be implemented as board-shaped bent members/stamping members in a manner that a material is single. The drawer apparatus may further include the expansion card. The expansion card may include one or more plug connectors used for connecting the expansion card and a main board of the industrial computer.

The disclosure further proposes an industrial computer including the drawer apparatus.

The industrial computer preferably includes a housing apparatus, which includes a cooling housing, an electronic device accommodation housing, and an accessory accommodation housing. The drawer apparatus can be pushed into the accessory accommodation housing and be drawn from the accessory accommodation housing.

The disclosure further proposes a method for accommodating an expansion card of an industrial computer in a drawer apparatus. The method includes the following steps: providing a drawer used for accommodating the expansion card of the drawer apparatus, where the drawer includes a bottom portion and at least one side wall connected to the bottom portion; pushing the expansion card into the drawer; and fastening the expansion card on the drawer by means of a fixing element of the drawer apparatus, where the fixing element at least sectionally buckles the side wall and the expansion card in a shape fitting manner.

The method may also include pushing the drawer into the accessory accommodation housing of the industrial computer.

According to one implementation manner, the expansion card is supported by means of at least one support member, and the support member is guided in at least one guide groove disposed on the bottom portion.

The at least one support member may be preferably movable. In this way, the drawer apparatus may match with different expansion cards of different sizes.

In features or implementations manners that are described by means of embodiments in the above or in the below, some combinations are not explicitly indicated in this text and also include other feasible implementation solutions of the drawer apparatus, the industrial computer, and/or the method. Improvement or supplement solutions proposed by a person skilled in the art specific to the drawer apparatus, the industrial computer, and/or the method in a form of independent aspects are also other feasible implementation solutions of the disclosure.

Refer to dependent claims and embodiments described in the below of the drawer apparatus, the industrial computer, and/or the method for more favorable design solutions and aspects of the drawer apparatus, the industrial computer, and/or the method. The drawer apparatus, the industrial computer, and/or the method are described in detail below with reference to preferable implementation manners shown in the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
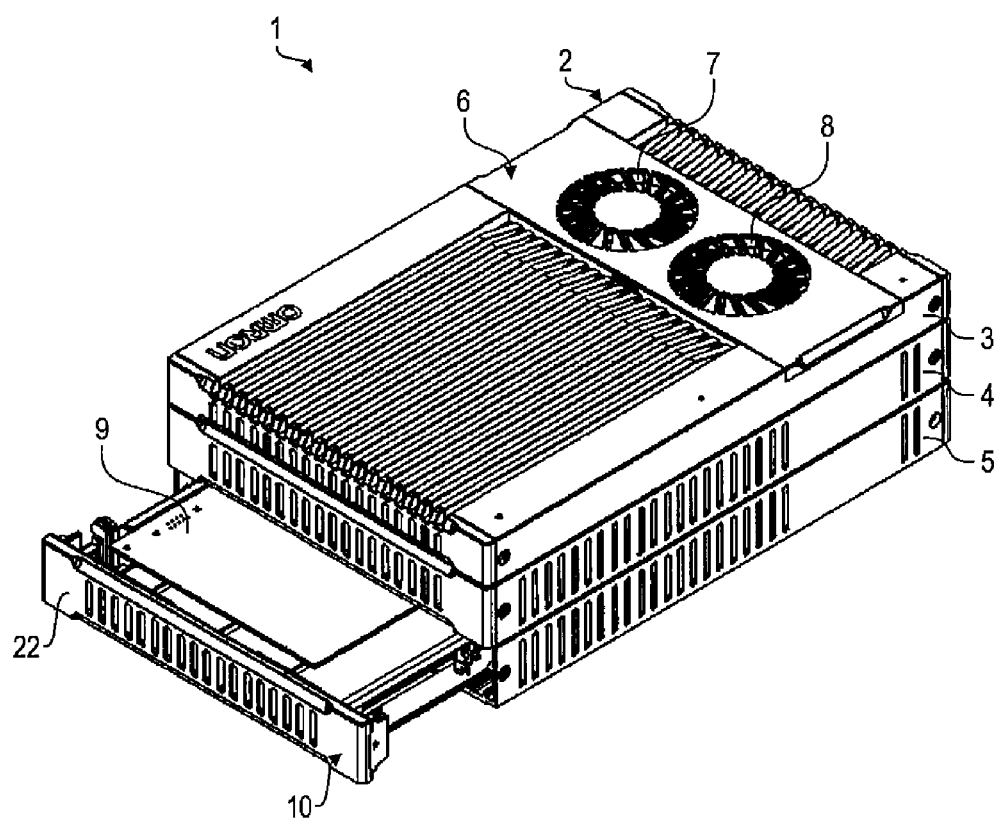
FIG. 1 is a schematic perspective view of an implementation manner of an industrial computer.

Reference will now be made in detail to the present preferred embodiments of the disclosure, examples of which are illustrated in the accompanying drawings. Wherever possible, the same reference numbers are used in the drawings and the description to refer to the same or like parts.

Unless described otherwise, same elements or elements having same functions in the accompanying drawings are represented with a same reference sign.

FIG. 1 is a schematic perspective view of an implementation manner of an industrial computer. An industrial computer 1 or an industrial personal computer or an IPC for short refers to a computer of tasks preferably used in the industrial field, and especially refers to a computer that is compatible with a PC, similar to IBM and that especially can work specific to software of the device. A common application scenario of the industrial computer 1 is process visualization, robot technologies, industrial automation, testing and experiment board working modes, security technologies, or quality guarantee. The industrial computer 1 for devices within an administrative area needs to satisfy special requirements, usually is not influenced by environment factors or electromagnetic interference, and hardly has a fault on the whole.

The industrial computer 1 includes a modular housing apparatus 2. The modular housing apparatus 2 refers to an apparatus formed constructed by multiple unit modules. These units may be especially separated and connected without a tool. The housing apparatus 2 here includes a square cooling housing 3, a square electronic device accommodation housing 4, and at least one square accessory accommodation housing 5. In orientation of FIG. 1, the electronic device accommodation housing 4 is arranged on the accessory accommodation housing 5, and the cooling housing 3 is arranged on the electronic device accommodation housing 4. Therefore, the electronic device accommodation housing 4 is arranged between the cooling housing 3 and the accessory accommodation housing 5. The cooling housing 3, the electronic device accommodation housing 4, and/or the accessory accommodation housing 5 may be made of plastics.

The electronic device accommodation housing 4 is adapted to accommodate electronic components, such as a main hoard (or a mother board), a processor or a CPU or other electronic components of the industrial computer 1. The cooling housing 3 is adapted for cooling the electronic components accommodated in the electronic device accommodation housing 4. For this, the cooling housing 3 may include a cooling unit 6 including two fans 7 and 8. The accessory accommodation housing 5 is adapted to accommodate extra components of the industrial computer 1, such as a disc drive, a hard disk, a power source member, and/or an extra circuit board that can be connected to the main board. Particularly, the accessory accommodation housing 5 may be adapted to accommodate an expansion board or an expansion card 9 of the industrial computer 1.

Figure 13:
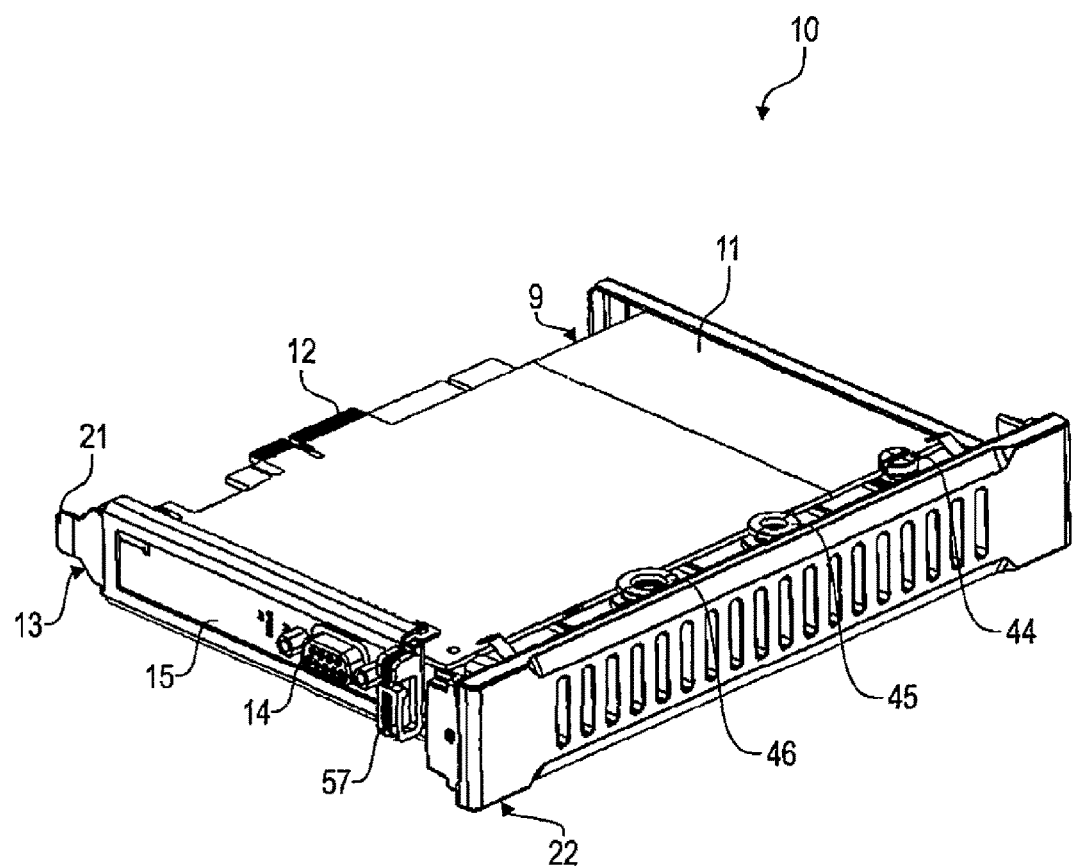
FIG. 13 is another schematic perspective view of the drawer apparatus shown in FIG. 5.

As shown in FIG. 1 to FIG. 4, the industrial computer 1 and especially the accessory accommodation housing 5 include a drawer apparatus 10 for use in the expansion card 9. The drawer apparatus 10 may be pushed into the accessory accommodation housing 5 in a drawer manner and then be drawn from the accessory accommodation housing. FIG. 1 shows the drawer apparatus 10 in a state of being partially pushed into the accessory accommodation housing 5 or being drawn from the accessory accommodation housing. The expansion card 9 includes a circuit board or a printed circuit board 11 used for fastening (especially welding) an electronic component. The printed circuit board 11 may include a plug connector 12 (FIG. 13). For example, the printed circuit board 11 may be connected to the main board of the industrial computer 1 by means of the plug connector.

The expansion card 9 further includes a fixing hoard 13. The fixing board 13 may be a steel board. The fixing board 13 is disposed on a side surface of the printed circuit board 11 and is fixedly connected to the printed circuit board 11. Particularly, the fixing board 13 is arranged vertical to the printed circuit board 11.

Figure 9:
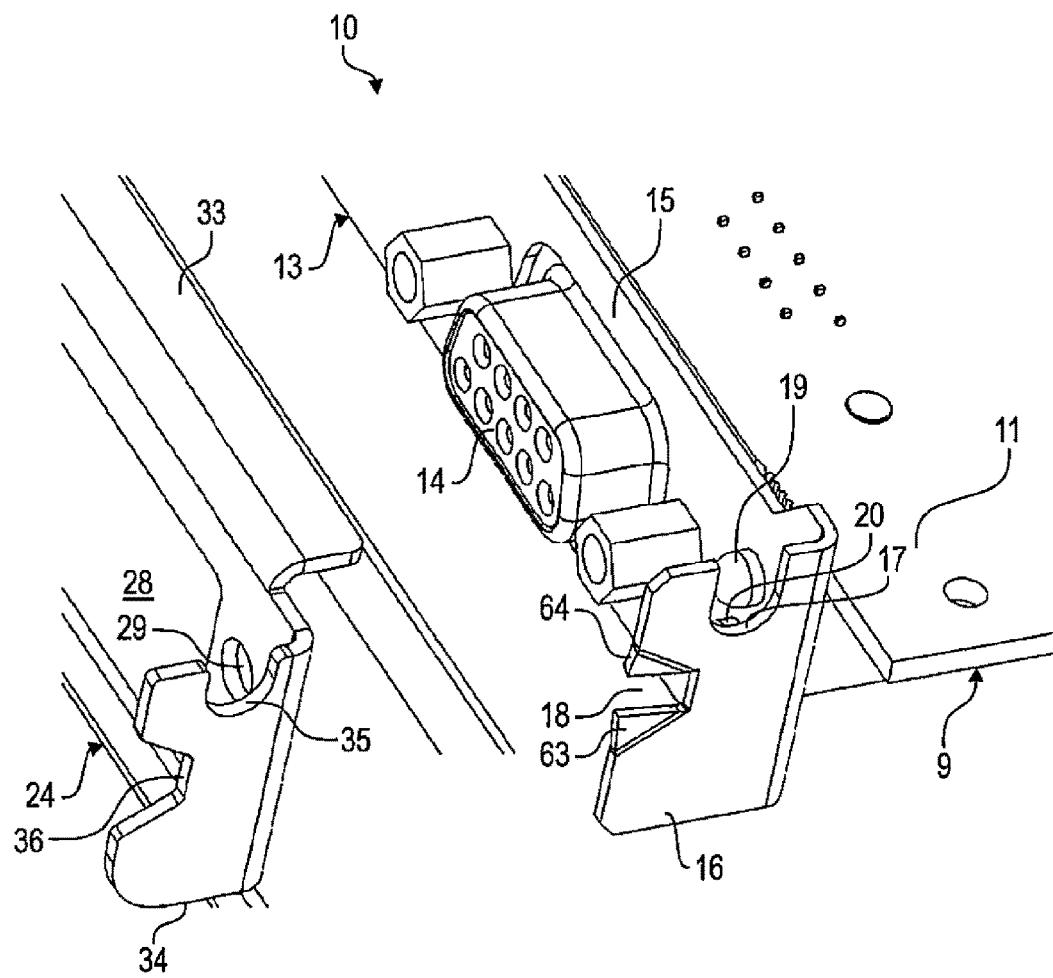
FIG. 9 is a local schematic perspective view of the drawer apparatus shown in FIG. 5.

As shown in FIG. 9 to FIG. 14, a plug connector 14 is disposed on the fixing board 13. As shown in FIG. 9, the fixing board 13 includes basic section 15, and the plug connector 14 is fastened to the basic section. A fixing section 16 is further disposed on the basic section 15. The fixing section 16 is positioned in a manner of being vertical to the basic section 15 and is oriented away from the printed circuit board 11. The fixing section 16 is provided with a first groove 17 on a top surface and is provided with a second groove 18 on a front surface, that is, on a side away from the printed circuit board 11.

In addition, at a position adjacent to the fixing section 16, light emitting diodes 19 and 20 (LED) (FIG. 12 and FIG. 14) may pass through the basic section 15. A mounting section 21 (FIG. 13 and FIG. 14) is disposed on a tail section, away from the fixing section 16, of the basic section 15. The drawer apparatus 10 may include the expansion card 9.

Figure 5:
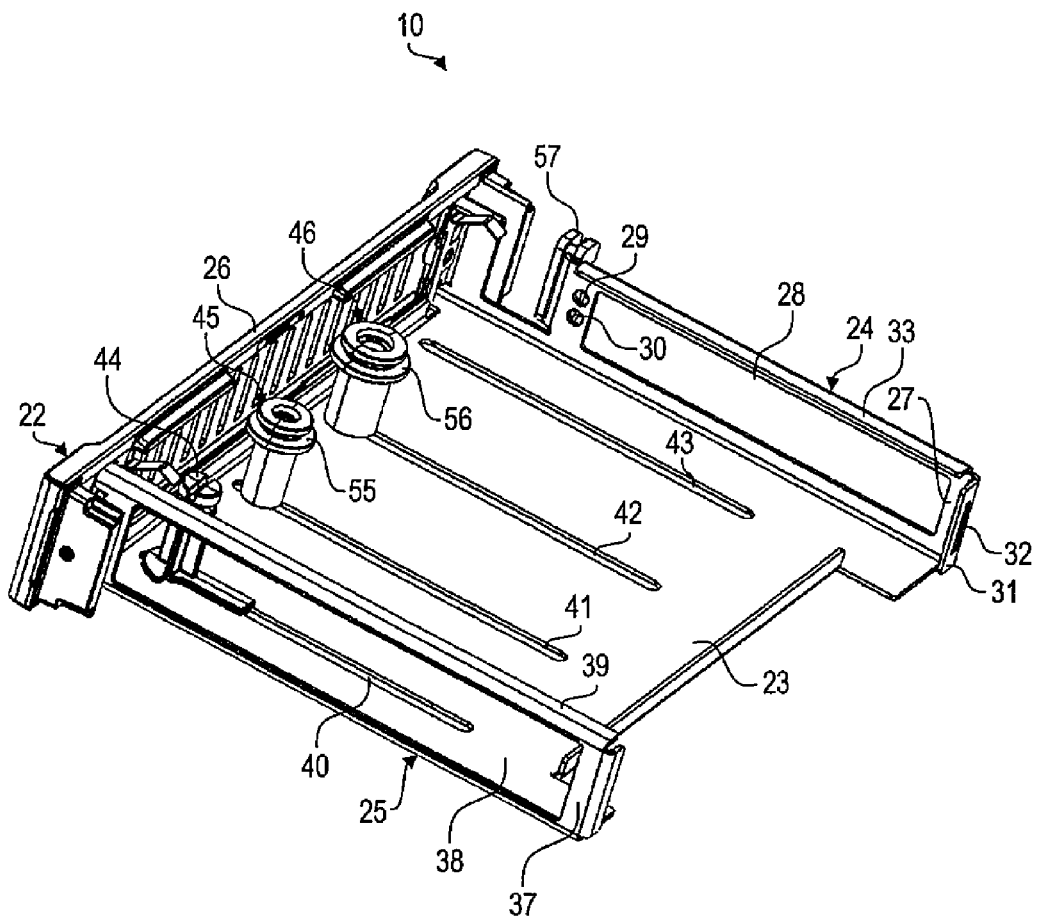
FIG. 5 is a schematic perspective view of an implementation manner of a drawer apparatus of the industrial computer shown in FIG. 1.

The drawer apparatus 10 includes a drawer 22 used for accommodating the expansion card 9. As shown in FIG. 5, the drawer 22 includes a bottom portion 23, a first side wall 24, a second side wall 25 arranged opposite to the first side wall 24, and a front wall 26 arranged between the first side wall 24 and the second side wall 25. For example, the bottom portion 23 and the side walls 24 and 25 may be implemented as board-shaped bent members/stamping members that is formed by a single material. The front wall 26 may be made of plastics.

The first side wall 24 includes a basic section 27 which includes a pierced hole 28 for the plug connector 14 of the expansion card 9 to pass through. The first side wall 24 further includes two drilled holes 29, 30. LEDs 19, 20 of the expansion card 9 may pass through the drilled holes 29, 30.

The first side wall 24 further includes an accommodation section 31 bent towards a direction of the second side wall 25 and includes a pierced hole 32 used for accommodating the mounting section 21 of the expansion card 9. The first side wall 24 includes a bent portion 33 which is parallel to the bottom portion 23 and spaced from the bottom portion 23 at a certain distance. A fixing section 34 of the first side wall 24 is disposed opposite to the accommodation section 31 and away from the second side wall 25 in an oriented manner (FIG. 9). The fixing section 34 is positioned in a manner of being vertical to the basic section 27. As shown in FIG. 9, the fixing section 34 includes a first groove 35 corresponding to the first groove 17 of the fixing section 16 of the expansion card 9 and a second groove 36 corresponding to the second groove 18 of the fixing section 16 of the expansion card 9. In this case, a size of the second groove 18 of the expansion card 9 is smaller than that of the second groove 36 of the fixing section 34 of the drawer 22.

Figure 3:
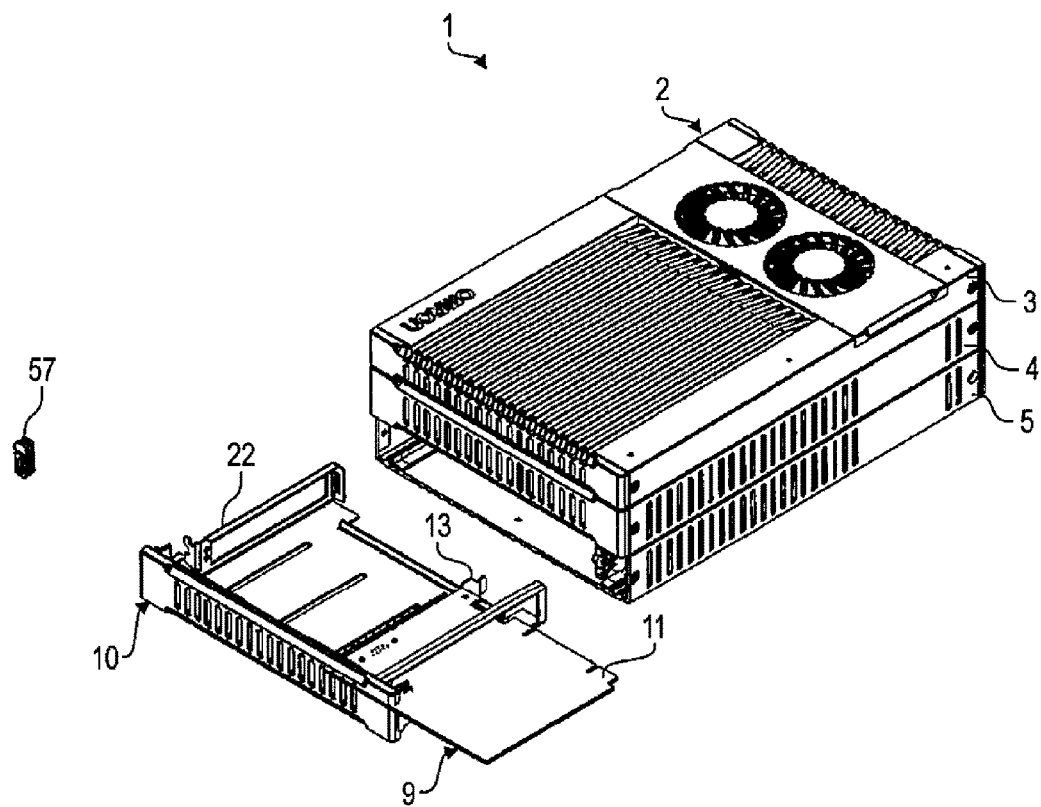
FIG. 3 is another schematic perspective view of the industrial computer shown in FIG. 1.

Now back to FIG. 5, the second side wall 25 of the drawer 22 includes a basic section 37 including a pierced hole 38. As shown in FIG. 3, the expansion card 9 may be inserted into the drawer 22 via the pierced hole. The second side wall 25 further includes a bent portion 39 which is parallel to the bottom portion 23 and spaced from the bottom portion 23 at a certain distance. Multiple guide grooves 40 to 43 are disposed in the bottom portion 23, and these guide grooves are parallel to the side walls 24, 25. The guide grooves 40 to 43 are constructed as pierced holes in the bottom portion 23. A quantity of the guide grooves 40 to 43 is random. For example, four guide grooves 40 to 43 are disposed.

Figure 6:
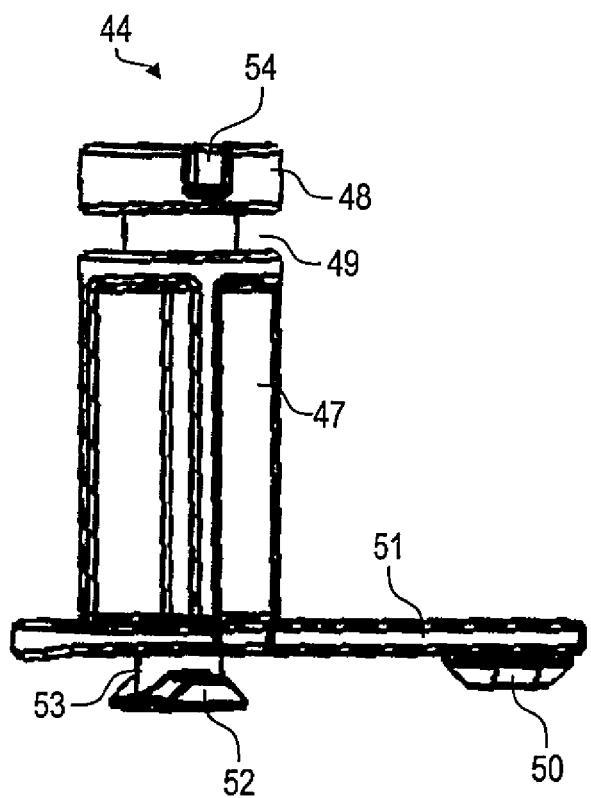
FIG. 6 is a schematic side view of an implementation manner of a support member for use in the drawer apparatus shown in FIG. 5.
Figure 7:
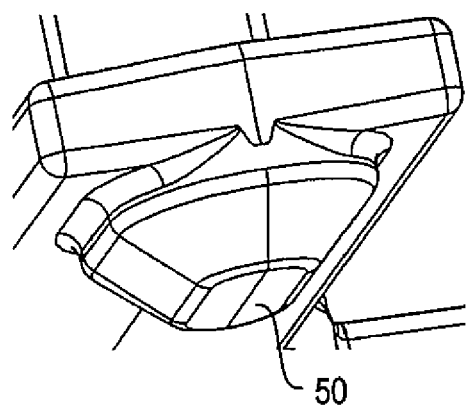
FIG. 7 is a local schematic perspective view of the support member shown in FIG. 6.

The drawer apparatus 10 further includes multiple support members 44 to 46 that are movably supported in the guide grooves 40 to 43. A quantity of the support members 44 to 46 does not need to conform to the quantity of the guide grooves 40 to 43. For example, three support members 44 to 46 are disposed. Particularly, as shown in FIG. 6 and FIG. 7, the first support member 44 includes a cylindrical basic section 47 and a head section 48. A groove 49 used for accommodating the printed circuit board 11 is disposed between the head section 48 and the basic section 47. The first support member 44 includes a guide pin 50, and the guide pin 50 is connected to the basic section 47 by means of a plate-shaped connection section 51.

The first support member 44 further includes a foot section 52 disposed below the bottom portion 23. The guide pin 50 and a guide section 53 arranged between the foot section 52 and the basic section 47 are guided along the guide groove 40. A gap 54 used for being inserted by a tool which is used for twisting the first support member 44 is disposed on the head section 48. To fasten the support member 44, the support member may be twisted by using a tool via the gap 54, so as to be fastened relative to the bottom portion 23.

Now back to FIG. 5 again, the second support member 45, same as the third support member 46, separately includes a head section 55, 56, and the head section is adapted to buckle the printed circuit board 11. The head section 56 of the third support member 46 may have a diameter greater than that of the head section 55 of the second support member 45. The support members 45, 46 may be allocated to the guide grooves 41, 42.

Figure 8:
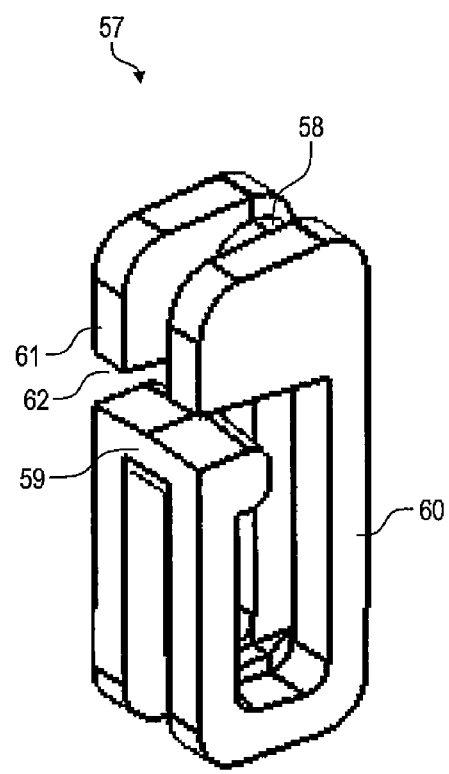
FIG. 8 is a schematic perspective view of an implementation manner of a fixing element for use in the drawer apparatus shown in FIG. 5.

The drawer apparatus 10 further includes a fixing element 57 shown in FIG. 8, which is adapted to at least sectionally buckle the first side wall 24 and especially the fixing section 34 of the first side wall 24 and the expansion card 9 and especially the fixing section 16 of the fixing board 13 of the expansion card 9 in a shape fitting manner, so as to fasten the expansion card 9 on the drawer 22. The fixing element 57 includes a shaft segment 58 and a locking section 59. The shaft segment 58 preferably includes a circular or partially circular geometric structure. The shaft segment 58 and the locking section 59 connects a first side segment 60 and a second side segment 61 of the fixing element 57. The fixing element 57 is preferably made of plastics. The fixing element 57 may be elastically deformable. The side segments 60, 61 both have a rectangular geometric structure including chamfered corners and a front notch 62, and the notch extends along a short edge of the rectangular geometric structure towards a direction of a long edge thereof.

Figure 2:
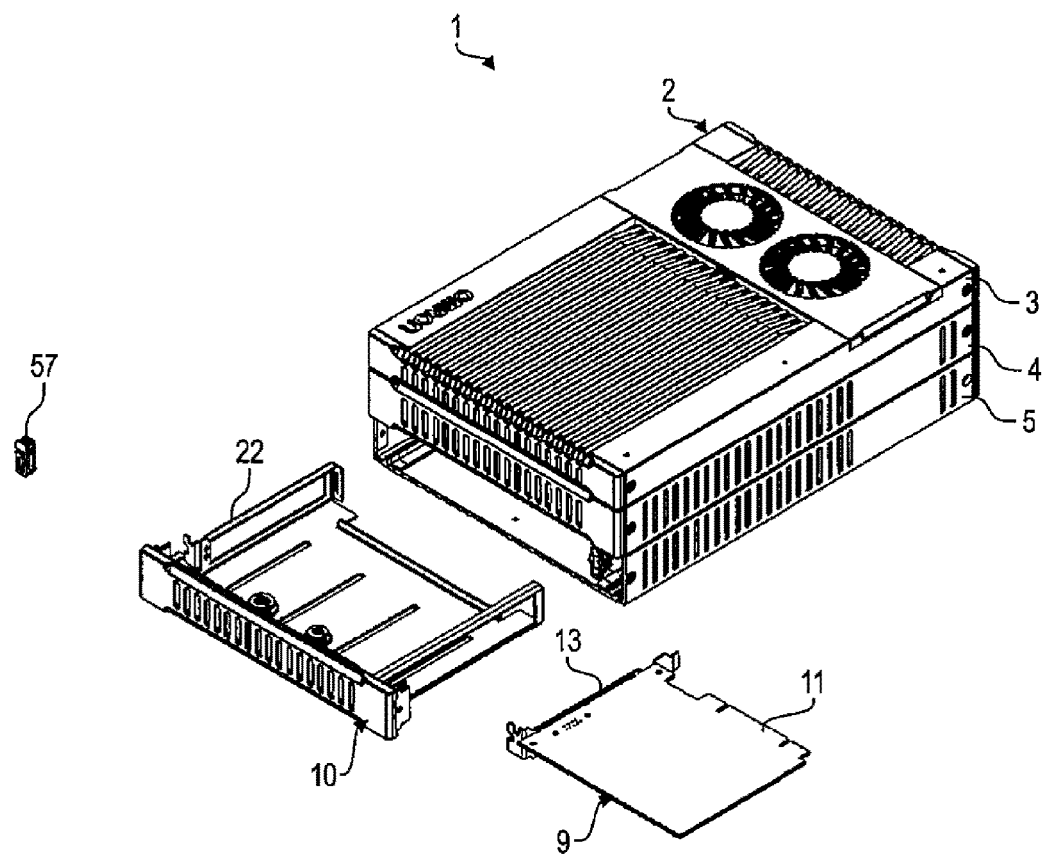
FIG. 2 is another schematic perspective view of the industrial computer shown in FIG. 1.
Figure 4:
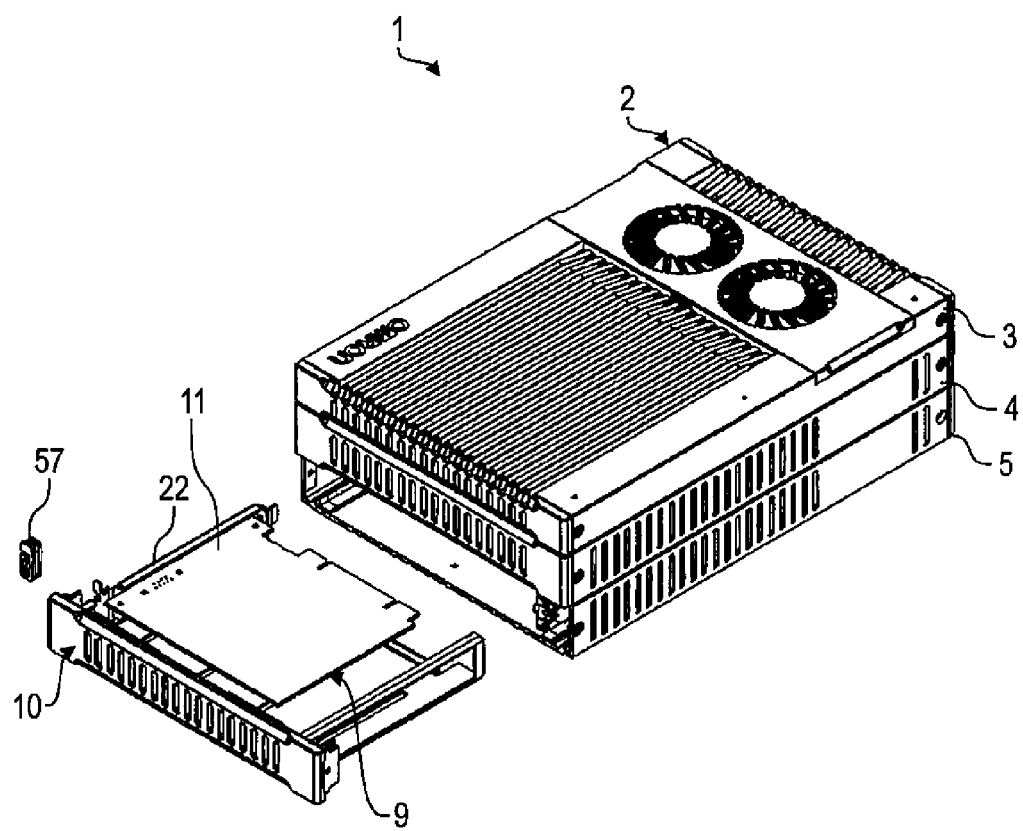
FIG. 4 is another schematic perspective view of the industrial computer shown in FIG. 1.

Functions of the drawer apparatus 10 are described in the below. As shown in FIG. 2 to FIG. 4, first the expansion card 9 passes through the pierced hole 38 of the second side wall 25 of the drawer 22 and is pushed into the drawer. In this case, the mounting section 21 of the fixing board 13 passes through the pierced hole 32 of the accommodation section 31 of the first side wall 24. The LEDs 19, 20 are inserted into the drilled holes 29, 30 of the first side wall 24.

Figure 10:
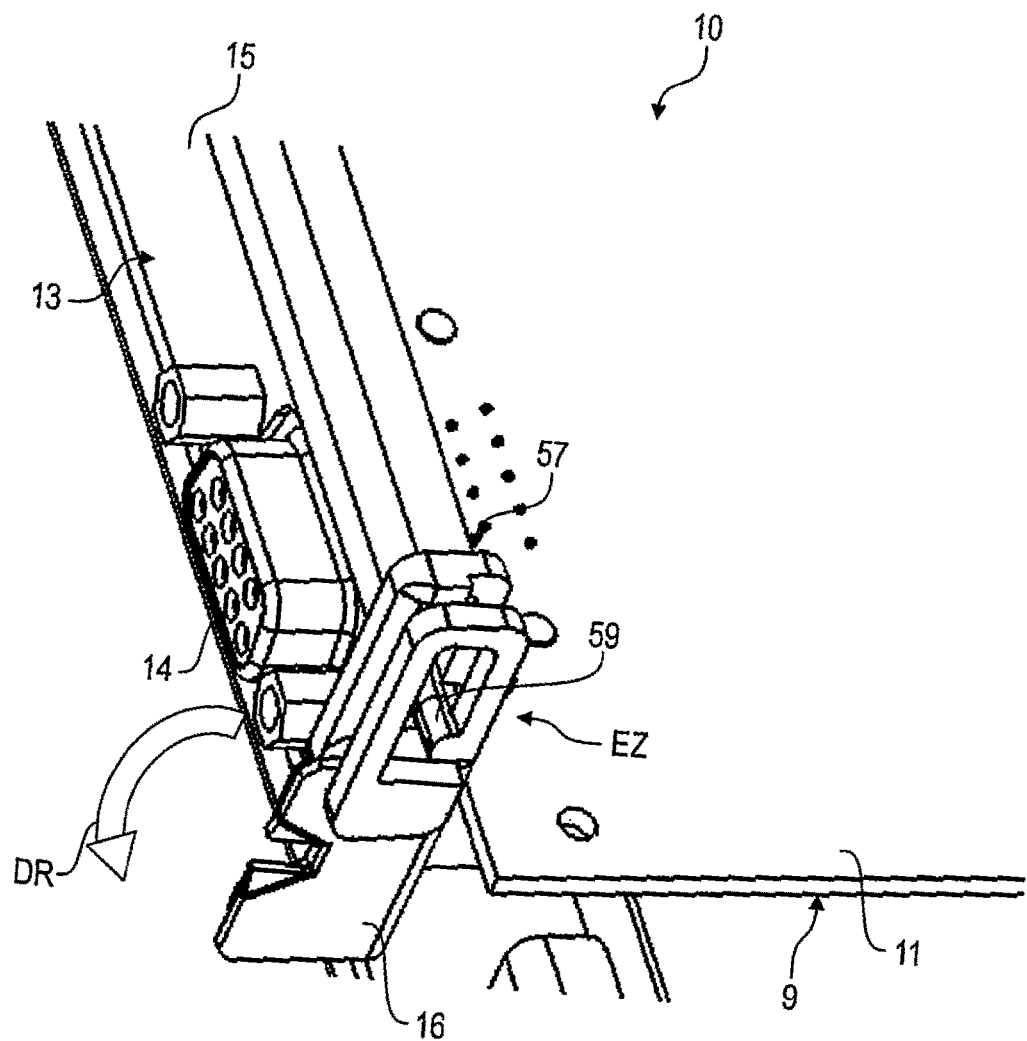
FIG. 10 is another local schematic perspective view of the drawer apparatus shown in FIG. 5.
Figure 11:
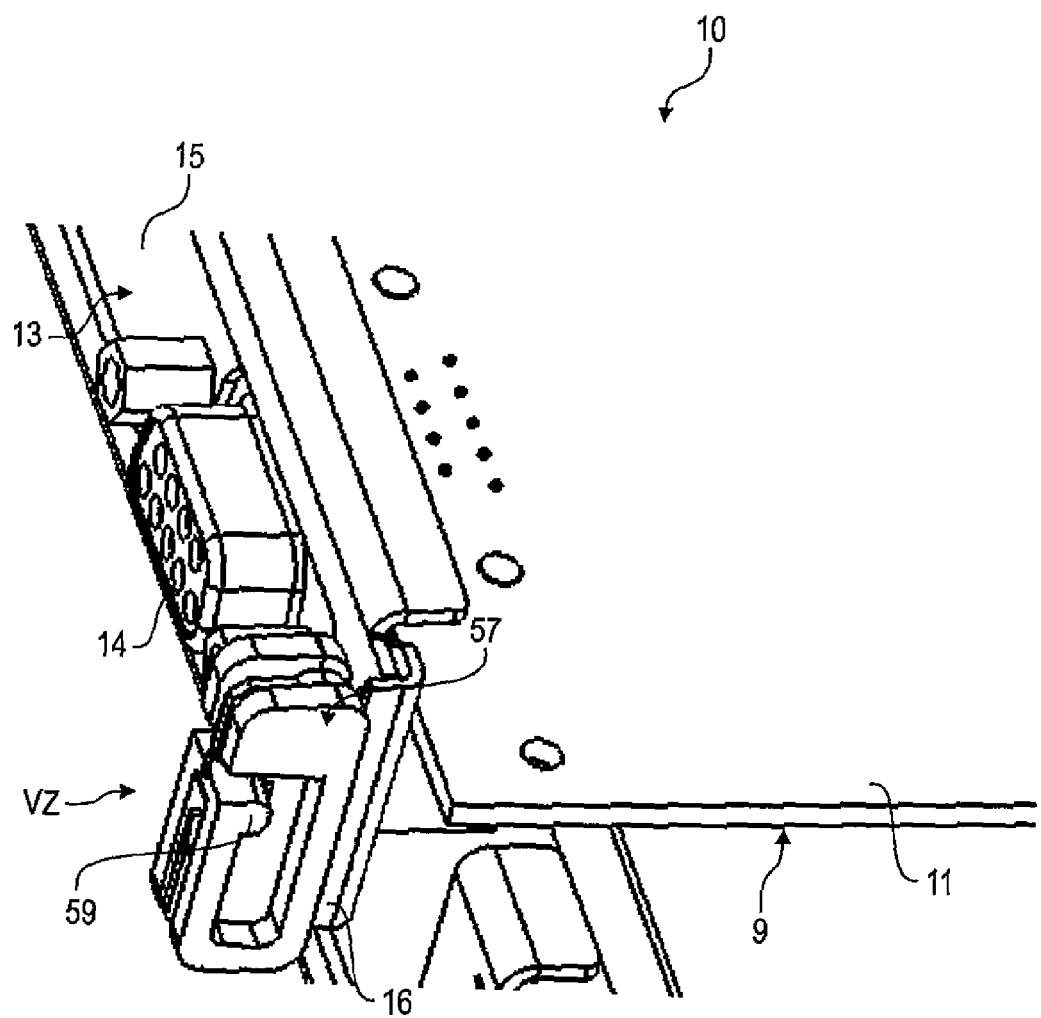
FIG. 11 is another local schematic perspective view of the drawer apparatus shown in FIG. 5.
Figure 12:
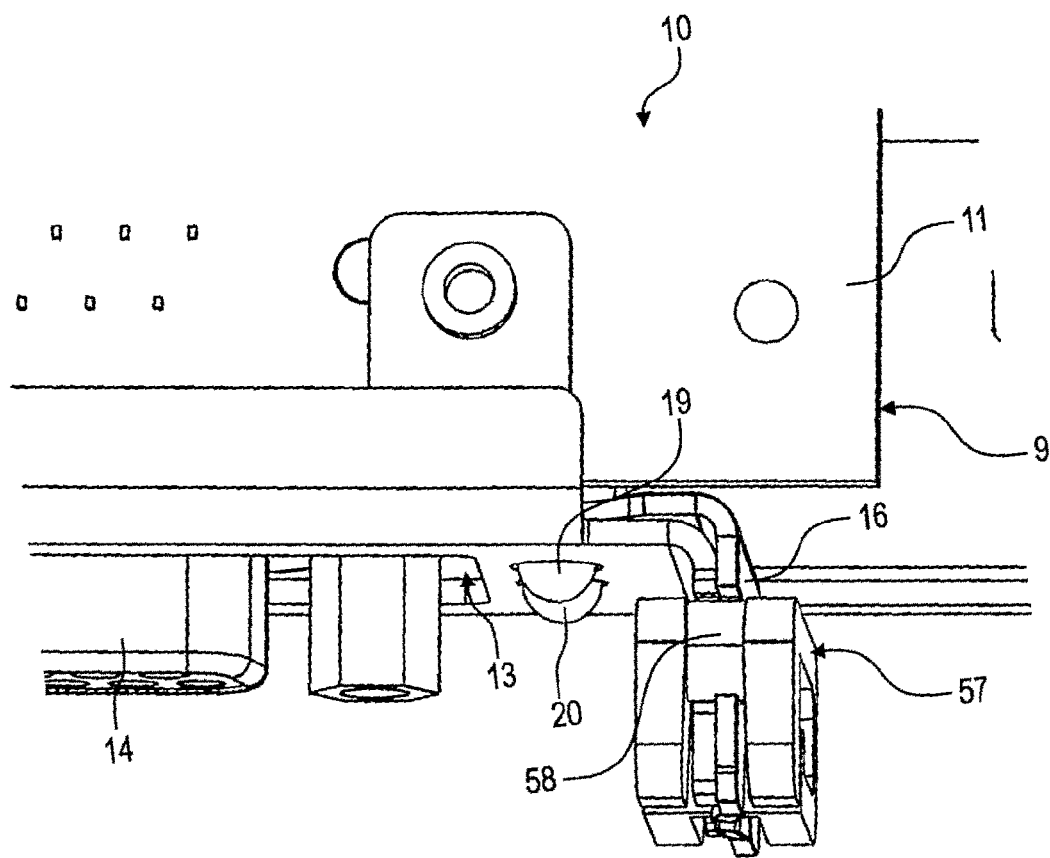
FIG. 12 is another local schematic perspective view of the drawer apparatus shown in FIG. 5.

Afterwards, as shown in FIG. 10, the fixing element 57 is embedded into the first grooves 17, 35. In this case, the shaft segment 58 is especially embedded into the first grooves 17, 35. FIG. 10 shows the fixing element 57 in an unlocking state EZ. In the unlocking state, the fixing element may be drawn upwards from the first grooves 17, 35 by being simply taken down. The fixing element 57 is made to enter the locking state VZ shown in FIG. 11 from the unlocking state EZ by twisting the fixing element 57 around the shaft segment 58 along a direction of rotation DR shown in FIG. 10. In this case, the locking section 59 is located in the second grooves 36, 18. Particularly, the locking section 59 is buckled into the second groove 18 of the fixing board 13 of the expansion card 9. In a locking state VZ, the fixing sections 16, 34 are pressed towards each other and are arranged between the side segments 60, 61 of the fixing element 57.

As shown in FIG. 9, alternative blade members or tooth members 63 and 64 are disposed on both sides of the second groove 18 of the expansion card 9, and cut into the locking section 59, so as to reliably fasten the fixing element 57.

Figure 14:
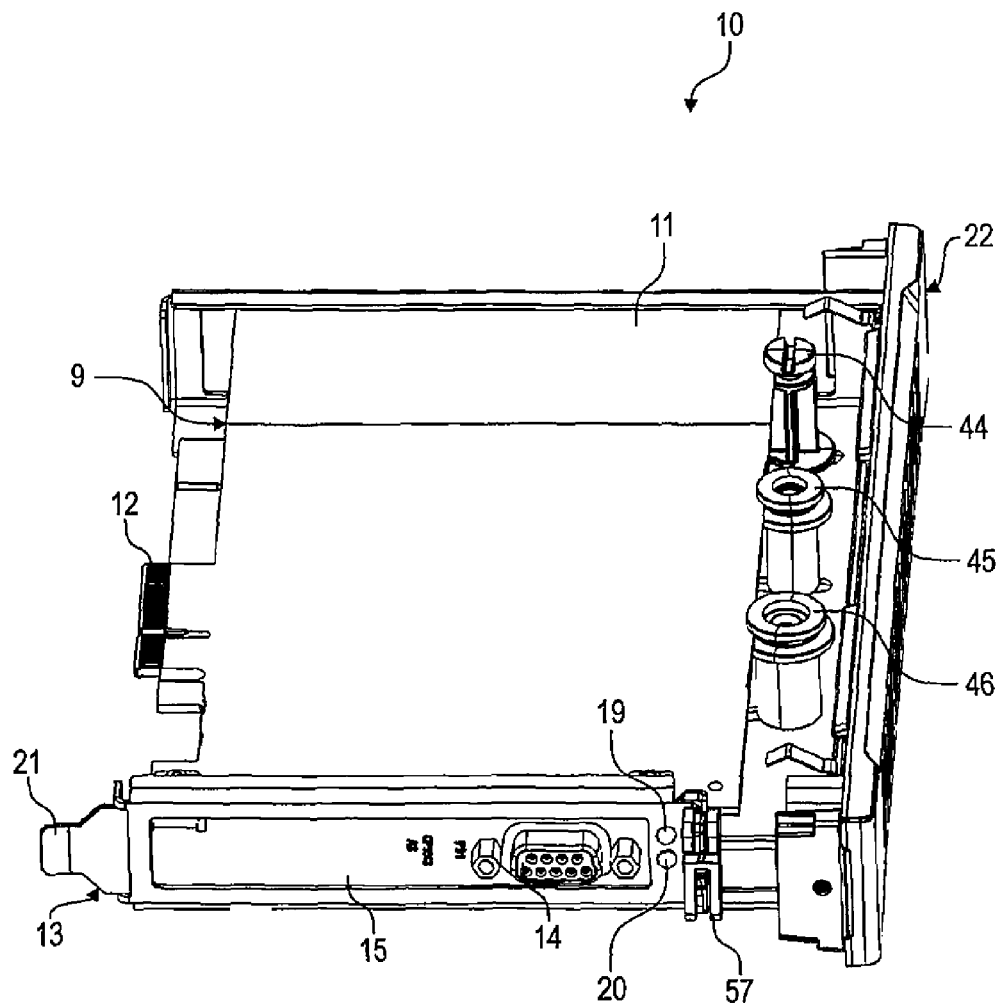
FIG. 14 is another schematic perspective view of the drawer apparatus shown in FIG. 5.
Figure 15:
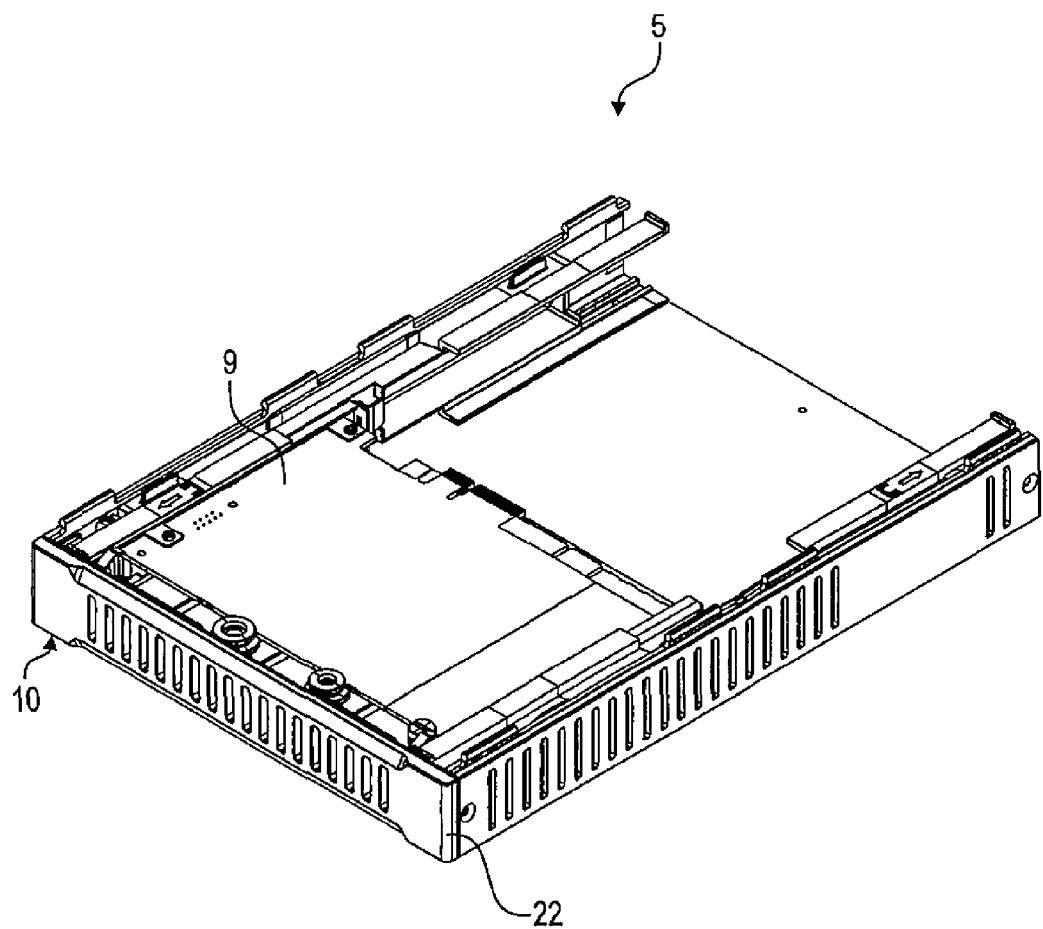
FIG. 15 is a schematic perspective view of an implementation manner of an accessory accommodation housing of the industrial computer shown in FIG. 1.

In addition, as shown in FIG. 13 and FIG. 14, the support members 44 to 46 may be positioned, so as to complementarily support the printed circuit board 11. The support members 44 to 46 may be correspondingly moved along the guide grooves 40 to 43 according to a type and a size of the used printed circuit board 11. After the expansion card 9 is fastened on the drawer 22 by means of the fixing element 57, as shown in FIG. 15, the drawer 22 may be completely pushed into the accessory accommodation housing 5.

Figure 16:
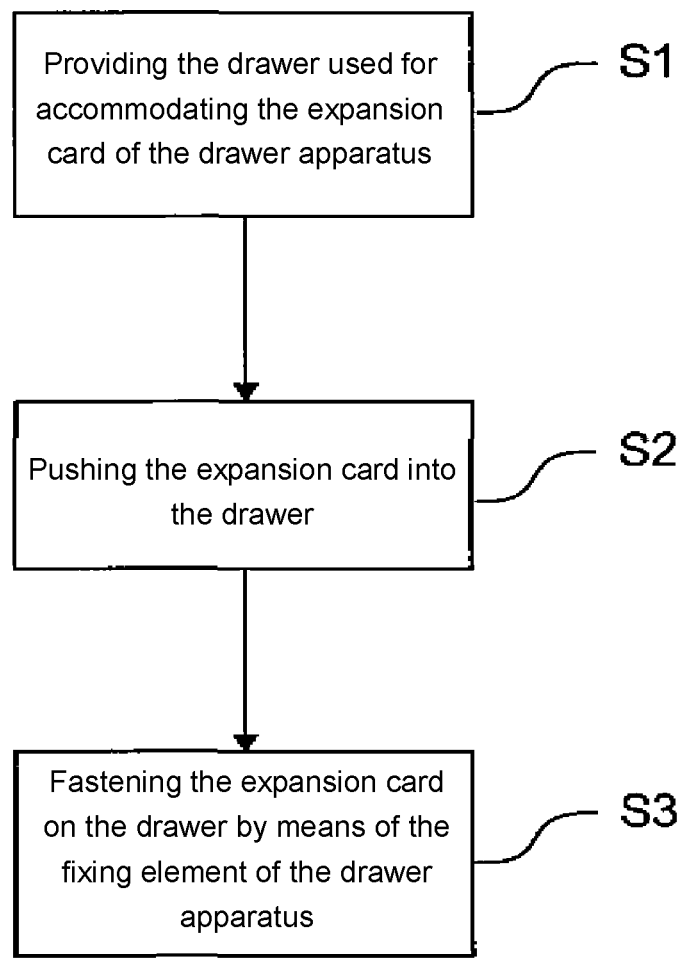
FIG. 16 is a schematic block diagram of an implementation manner of a method for accommodating an expansion card in the drawer apparatus shown in FIG. 5.

FIG. 16 is a schematic block diagram of an implementation manner of a method for accommodating an expansion card 9 of an industrial computer 1 in a drawer apparatus 10. Step S1: a drawer 22 used for accommodating the expansion card 9 of the drawer apparatus 10 is provided. Step S2: the expansion card 9 is pushed into the drawer 22. Step S3: the expansion card 9 is fastened on the drawer 22 by means of the fixing element 57, wherein the fixing element 57 at least sectionally buckles the first side wall 24 and the expansion card 9 in a shape fitting manner.

This text describes the disclosure with reference to several embodiments. However, the disclosure may use various change solutions.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A drawer apparatus (10) for an expansion card (9) having a fixing board (13) of an industrial computer (1), comprising:
    a drawer (22) used for accommodating the expansion card (9), wherein the drawer (22) comprises a bottom portion (23) and at least one side wall (24) connected to the bottom portion (23); and
    a fixing element (57), wherein the fixing element (57) is adapted to at least stepwisely buckle the at least one side wall (24) and the expansion card (9) in a shape fitting manner, so as to fasten the expansion card (9) on the drawer (22), wherein the at least one side wall (24) comprises a basic section (27) and a fixing section (34) vertically protruding from the basic section (27), the fixing section (34) comprises a first groove (35) and a second groove (36), and the fixing element (57) is engaged into the first groove (35) and the second groove (36) in a locking state (VZ).

2. The drawer apparatus according to claim 1, wherein the fixing element (57) is adapted to buckle the fixing section (34) of the at least one side wall (24) and the fixing board (13) of the expansion card (9) in a shape fitting manner.

3. The drawer apparatus according to claim 1, wherein the fixing element (57) comprises a shaft segment (58) supported in the first groove (35) in a rotatable manner, and the fixing element (57) is adapted to enter the locking state (VZ) from an unlocking state (EZ) by means of rotation around the shaft segment (58), and vice versa.

4. The drawer apparatus according to claim 1, wherein the fixing element (57) comprises a locking section (59), which is adapted to be engaged into the second groove (36) in a shape fitting manner in the locking state (VZ).

5. The drawer apparatus according to claim 4, wherein the locking section (59) is adapted to be engaged into the fixing board (13) of the expansion card (9).

6. The drawer apparatus according to claim 1, further comprising at least one support member (44-46), which is adapted to support the expansion card (9).

7. The drawer apparatus according to claim 6, wherein the at least one support member (44-46) is guided in at least one guide groove (40-43) disposed on the bottom portion (23).

8. The drawer apparatus according to claim 7, wherein the at least one support member (44-46) comprises a guide pin (50), which is guided in the at least one guide groove (40-43).

9. The drawer apparatus according to claim 7, wherein multiple guide grooves (40-43) are disposed, and the at least one support member (44-46) can be changed between different guide grooves (40-43).

10. The drawer apparatus according to claim 1, wherein the at least one side wall (24) comprises an accommodation section (31) for accommodating the fixing board (13) of the expansion card (9).

11. The drawer apparatus according to claim 1, wherein the at least one side wall (24) comprises a first side wall (24) and a second side wall (25) arranged opposite to the first side wall (24), wherein the fixing element (57) is disposed on the first side wall (24), and the second side wall (25) comprises a pierced hole (38) used for inserting the expansion card (9) into the drawer (22).

12. An industrial computer (1) comprising the drawer apparatus (10) according to claim 1.

13. A method for accommodating an expansion card (9) having a fixing board (13) of an industrial computer (1) in a drawer apparatus (10), comprising the following steps:

providing (S1) a drawer (22) used for accommodating the expansion card (9) of the drawer apparatus (10), wherein the drawer (22) comprises a bottom portion (23) and at least one side wall (24) connected to the bottom portion (23);

pushing (S2) the expansion card (9) into the drawer (22); and fastening (S3) the expansion card (9) on the drawer (22) by means of a fixing element (57) of the drawer apparatus (10), wherein the fixing element (57) at least stepwisely buckles a first side wall (24) and the expansion card (9) in a shape fitting manner, wherein the at least one side wall (24) comprises a basic section (27) and a fixing section (34) vertically protruding from the basic section (27), the fixing section (34) comprises a first groove (35) and a second groove (36), and the fixing element (57) is engaged into the first groove (35) and the second groove (36) in a locking state (VZ).

14. The method according to claim 13, wherein the expansion card (9) is supported by means of at least one support member (44-46), and the support member is guided in at least one guide groove (40-43) disposed on the bottom portion (23).

* * * * *